US006993895B2

(12) United States Patent
Wu (10) Patent No.: US 6,993,895 B2
(45) Date of Patent: Feb. 7, 2006

(54) LONG STICK MOWER

(76) Inventor: Chih-Chuan Wu, P.O. Box 82-144, Taipei (TW)

( * ) Notice: Subject to any disclaimer, the term of this patent is extended or adjusted under 35 U.S.C. 154(b) by 0 days.

(21) Appl. No.: 10/622,637

(22) Filed: Jul. 21, 2003

(65) Prior Publication Data

US 2005/0016149 A1    Jan. 27, 2005

(51) Int. Cl.
*A01D 34/08* (2006.01)
(52) U.S. Cl. .......................... 56/241; 56/263
(58) Field of Classification Search .................. 56/241, 56/296, 257, 262, 263, 261
See application file for complete search history.

(56) References Cited

U.S. PATENT DOCUMENTS 1,782,029 A * 11/1930 Clark ........................... 56/241
1,995,251 A *  3/1935 Hoskins ....................... 56/241
2,811,822 A * 11/1957 Woolf .......................... 56/241
2,931,158 A *  4/1960 Keiser, Jr. .................... 56/241

* cited by examiner

Primary Examiner—Meredith Petravick
(74) Attorney, Agent, or Firm—Leong C. Lei (57) ABSTRACT

A long-stick mower which includes a base, a fixed shear, a mobile shear, a driver, a linkage, an extension spring and an extension control rod. The base is connected to the lower end of the extension rod. The top of the driver is pivoted to the base and drawn toward the base by the extension spring. The linkage is pivoted to the top of the mobile shear at one end and to the drive at the other end. The extension spring is hooked to the bottom of the base to draw the drive. The extension control rod is inserted to the base. When the top of the extension control rod is pressed down, the driver has its caster to hold against the ground and the driver spreads up backward to draw the linkage to move backward to pull the mobile shear. When the extension control rod is pulled up, the driver is drawn back to push the linkage to move forward while pushing the mobile shear to spread up to complete an easy cycle of cutting.

1 Claim, 8 Drawing Sheets

LONG STICK MOWER

BACKGROUND OF THE INVENTION (a) Field of the Invention

The present invention is related to an improved structure of a long stick mower, and more particularly, to one provided with an extension rod to control a pair of shears for easier operation of the mower.

(b) Description of the Prior Art

Figure 1:
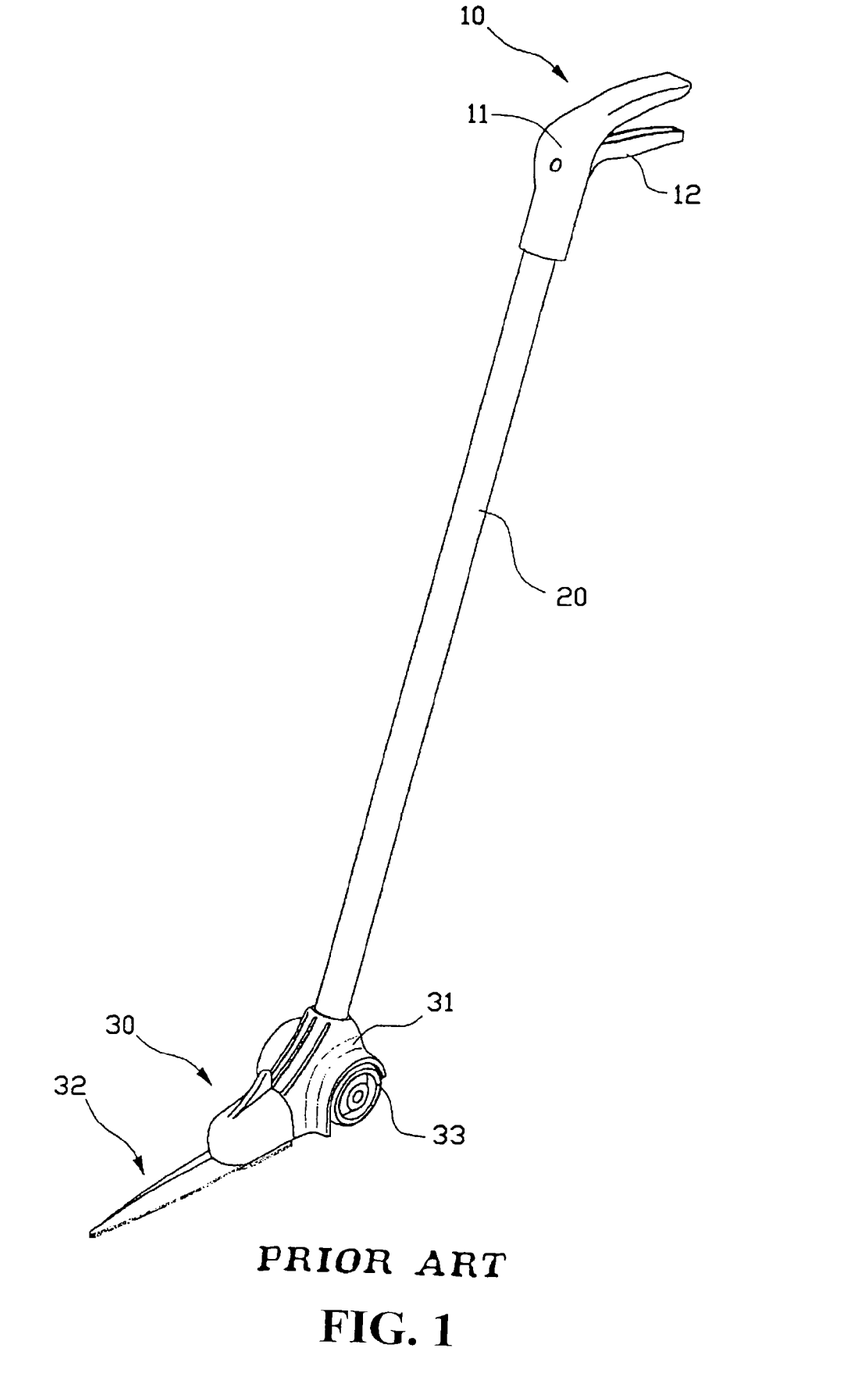
FIG. 1 is a perspective view of a prior art.
Figure 2:
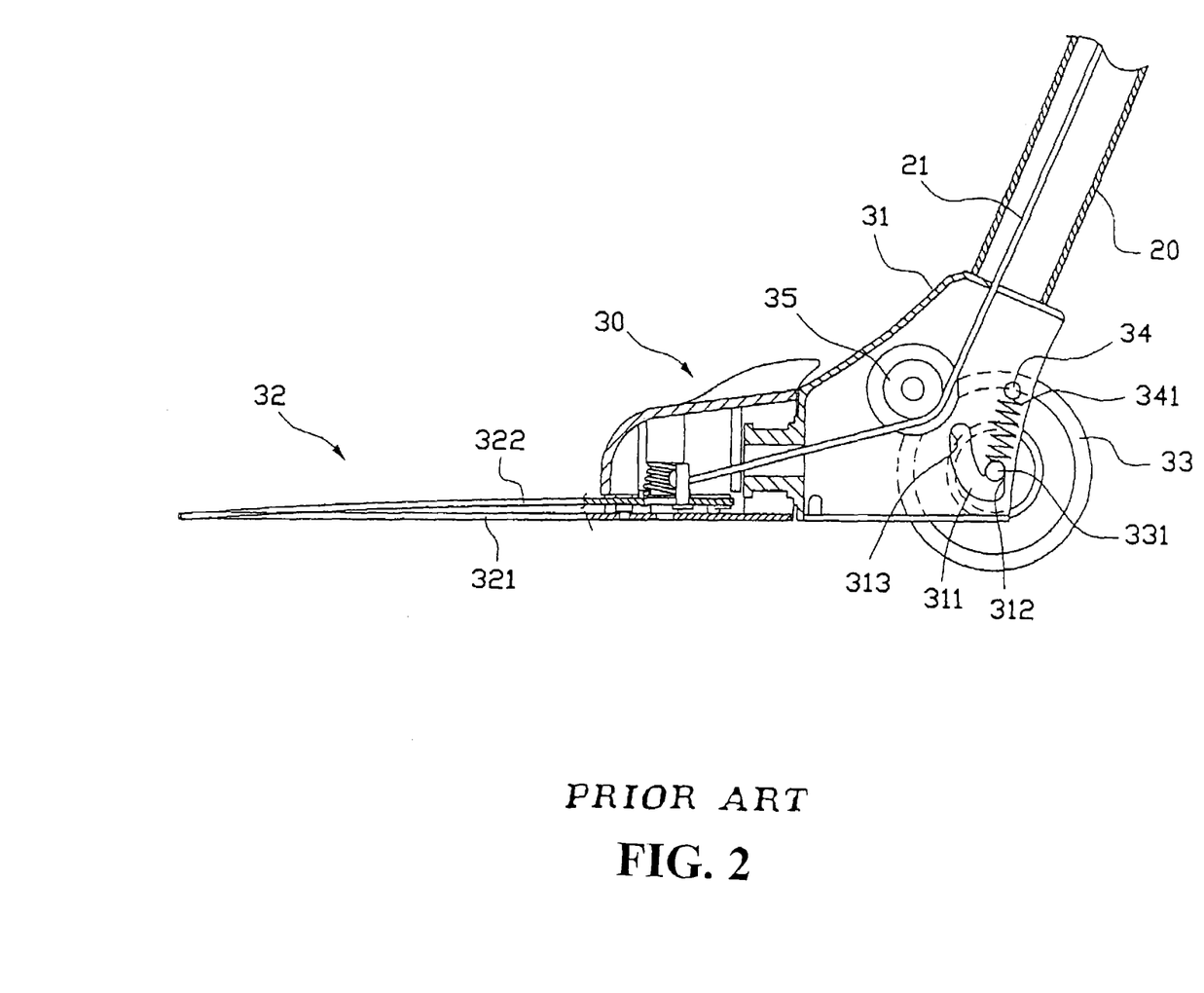
FIG. 2 is a side view of a working part of the prior art.

As illustrated in FIGS. 1 and 2 of the accompanying drawings of the present invention, a long stick mower of the prior art is essentially comprised of a control part (10), an extension part (20) and a working part (30). Wherein, the control part (10) includes a casing (11) pivoted with an active member (12). The top of the extension part (20) is fixed to below the casing (11) of the control part (10) and the bottom of the extension part (20) is fixed to the working part (30). A linkage (21) provided in the extension part (20) has one end connected to the active member (12). A base (31) is provided to the working part (30) and a pair of shears (32) comprised of a primary shear (321) and a secondary shear (322) is provided to the base (31). One end of the secondary shear (322) is connected to the linkage (21) and a guide device (35) to draw the linkage (21) is pivoted into the base (31). By connecting the active member (12) to the linkage (21), the secondary shear (322) exercises the cutting toward the primary shear (321). A guide groove (311) is each provided on both sides of and penetrates though the base (31). Each of both ends of the guide groove (311) is provided with a primary positioning part (312) and a secondary positioning part (313) at different heights. A shaft (331) penetrates through the guide grooves (311) and a caster (33) is each pivoted to both ends of the shaft (331). A lever (34) is provided to the base (31) at where higher than the guide groove (311) is located, and a flexible member (341) is used to connect both of the lever (34) and the shaft (331) for the lever to draw up and hold the shaft (331) in position either in the primary positioning part (312) or the secondary positioning part (313). However, many and complicate parts required for the control part (10) and the working part (30) will cause the selling price getting too expensive. Furthermore, it also makes maintenance and repair jobs more difficult.

SUMMARY OF THE INVENTION

The primary purpose of the present invention is to provide an improved structure for a long-stick mower that gives simple structure, lower production cost, more competitive selling price, and easier to use. To achieve the purpose, the present invention is comprised of a base, a fixed shear, a mobile shear, a driver, a linkage, an extension spring and an extension control rod. When the extension rod is pressed down, the mobile shear moves toward the fixed shear for cutting, and when the extension rod is released, the mobile shear spreads up.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 3:
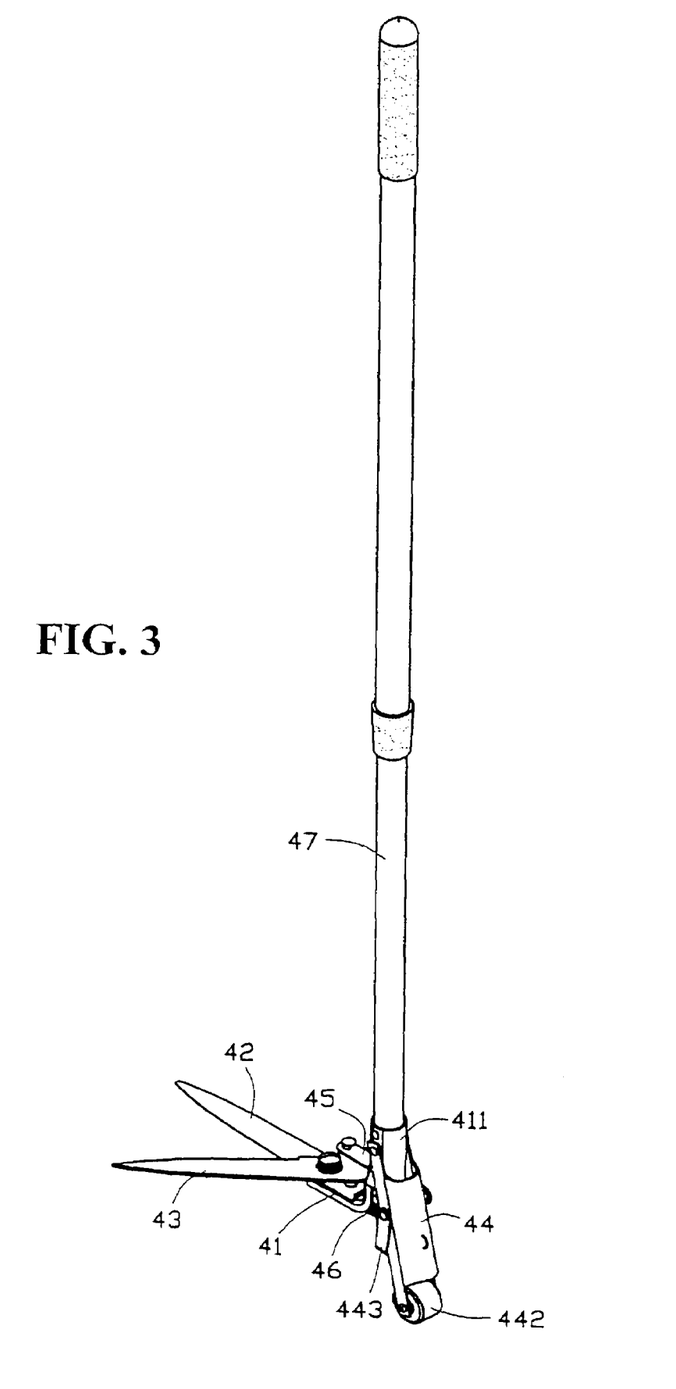
FIG. 3 is a perspective view of a preferred embodiment of the present invention.
Figure 4:
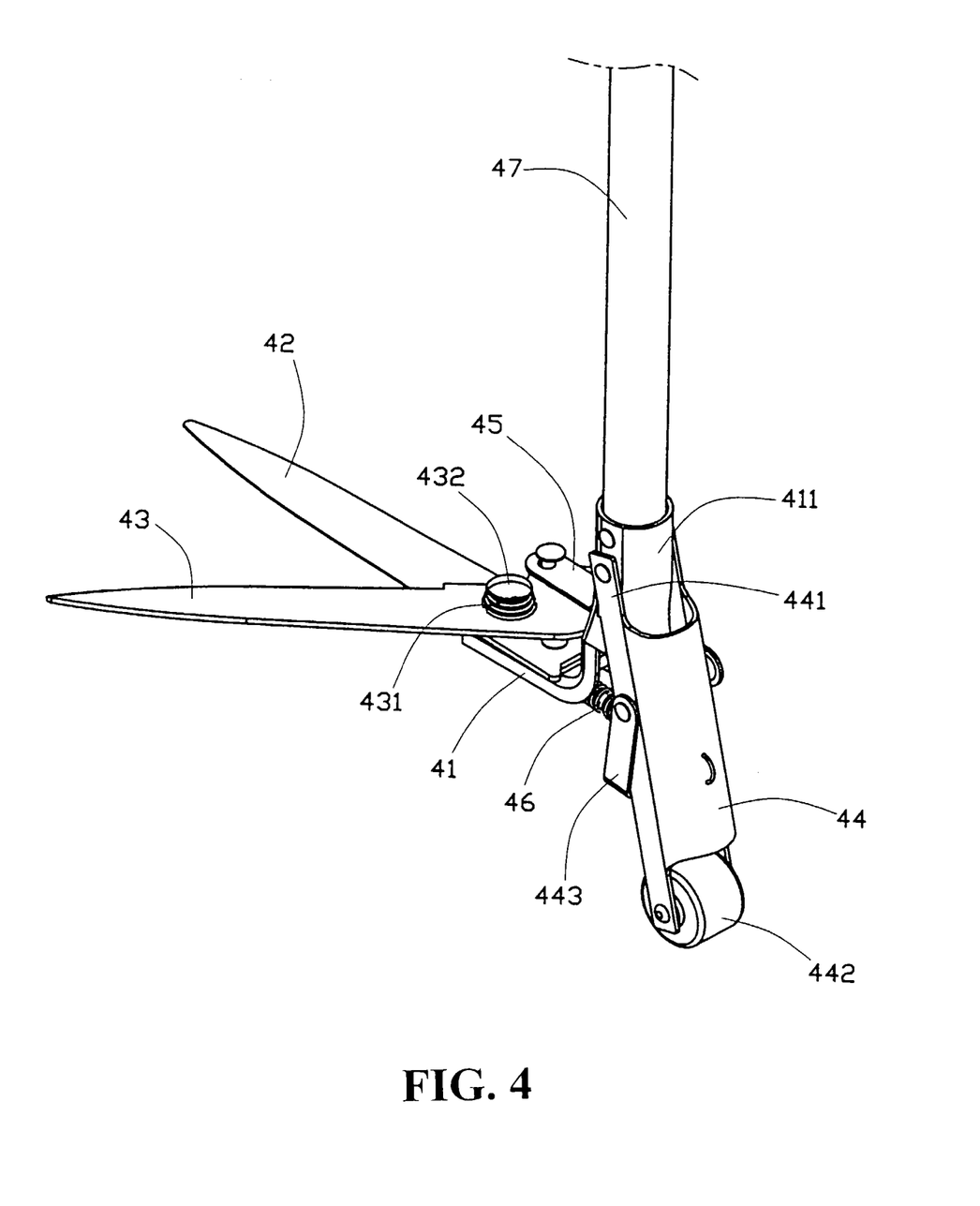
FIG. 4 is a blowout view of a local part of the preferred embodiment of the present invention.
Figure 5:
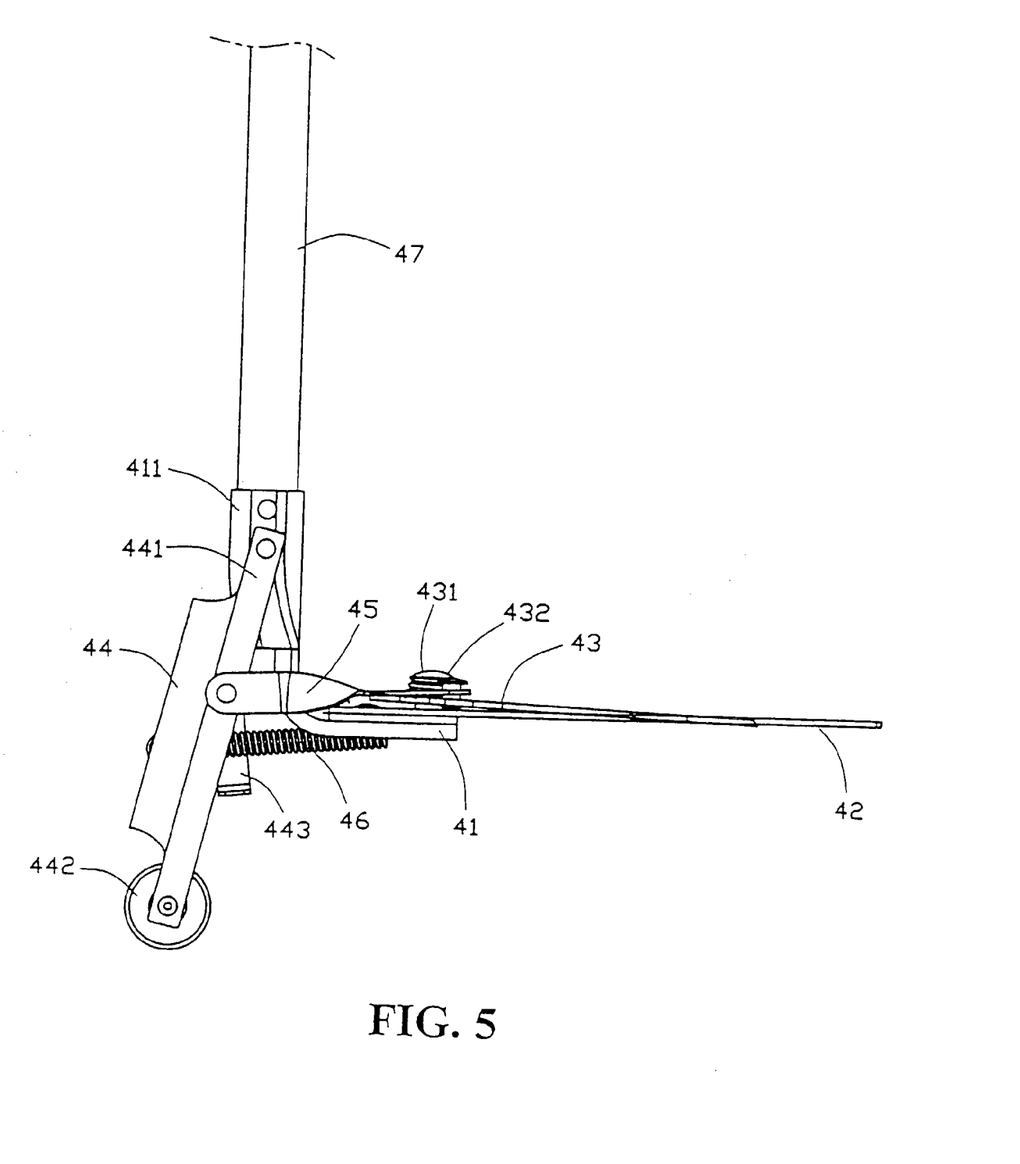
FIG. 5 is a side view of a local part of the assembly of the preferred embodiment.

The present invention is related to a long-stick mower in a very handy and practical structure. A preferred embodiment of the present invention as illustrated in FIGS. 3, 4, and 5 is essentially comprised of a base (41), a fixed shear (42), a mobile shear (43), a driver (44), a linkage (45), a extension spring (46) and an extension control rod (47). Wherein, the base (41) is in approximately an L shape with its erected part related to a sleeve (411) fixed to the lower end of the extension control rod (47). The fixed shear (42) is fixed to the bottom of the base (41) and the mobile shear (43) is pivoted to the top of the fixed shear (42) by means of a dead spring (431) and a rivet (432). The driver (44) having its top (441) pivoted to the sleeve (411) of the base (41), and its bottom adapted with a caster (442) is drawn towards the base (41) by means of the extension spring (46) and is adapted with a locking plate (433) on one side. The linkage (45) has its one end pivoted to the upside of the mobile shear (43) and the other end pivoted to the driver (44). The extension spring (46) has its one end hooked to the bottom of the base (41) and the other end drawing the driver (44). The extension control rod (47) is inserted into the sleeve (411) of the base (41).

Figure 6:
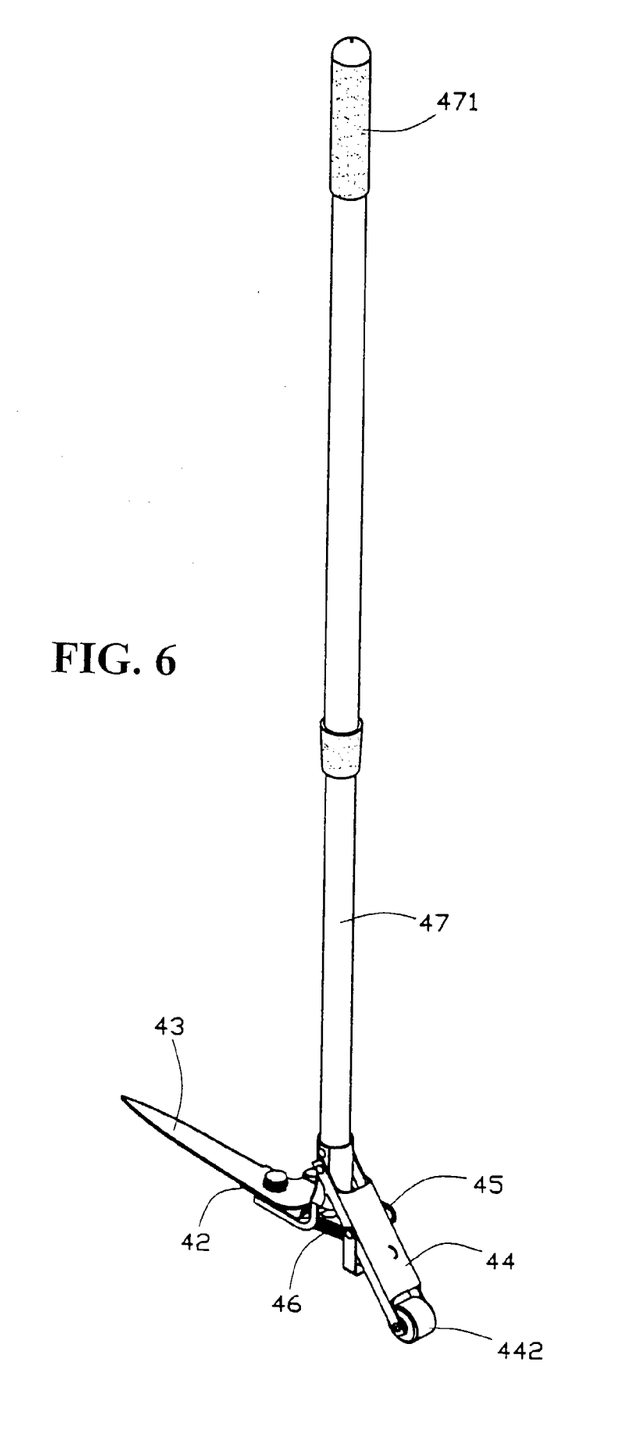
FIG. 6 is a schematic view showing that the preferred embodiment of the present invention is pressed down to cut.
Figure 7:
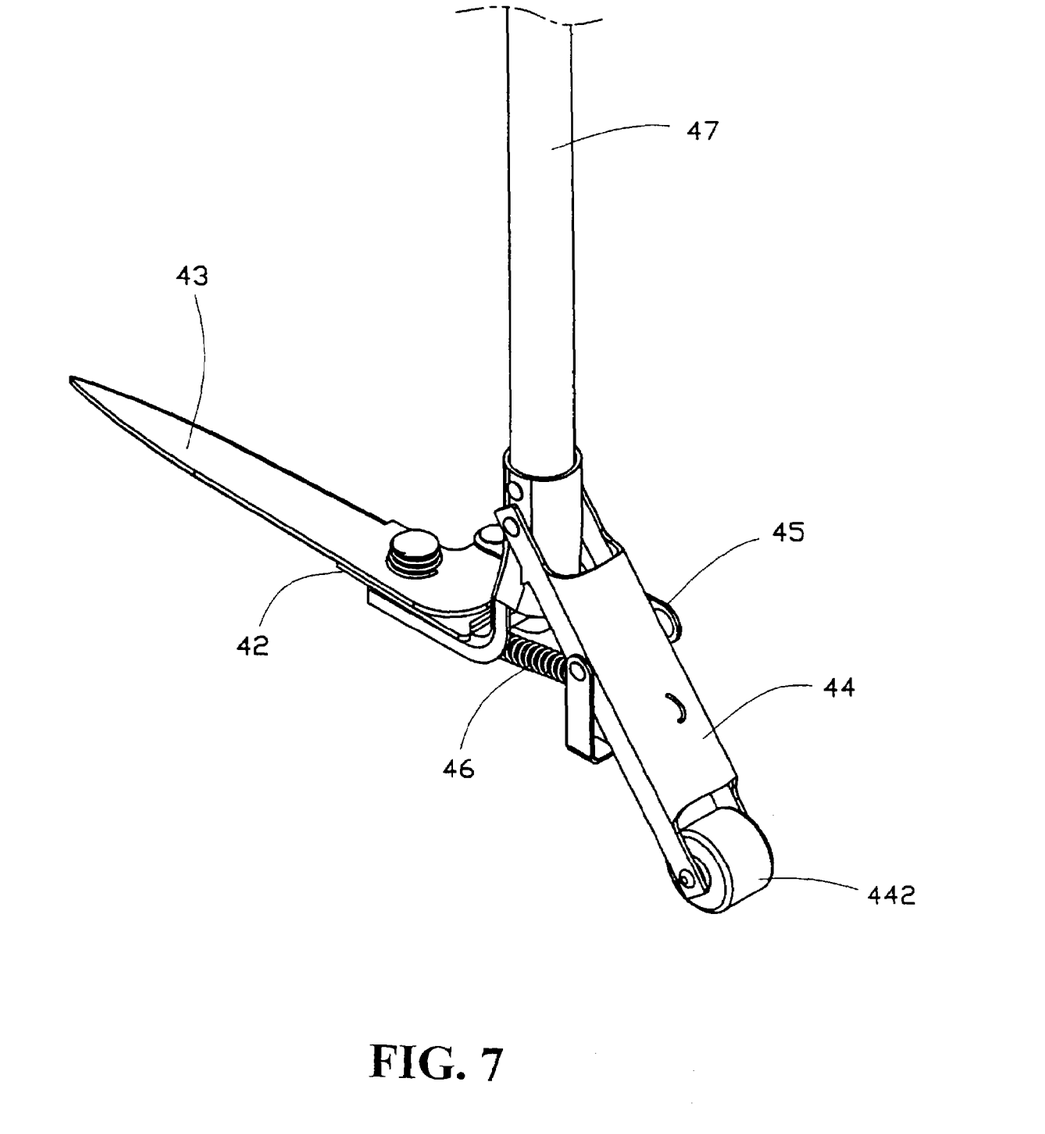
FIG. 7 is a schematic view showing a blowout of a local part of the preferred embodiment of the present invention is pressed down to cut.

Now referring to FIGS. 6 and 7, when the top (471) of the extension control rod (47) is pressed down, the driver (44) has its caster (442) to hold against the ground and the driver (44) spreads up backward to draw the linkage (45) to move backward to pull the mobile shear (43) for exercising the cutting in the direction of facing the fixed shear (42); then the extension control rod (47) is pulled up, the driver (44) is drawn back by the extension spring (46) to push the linkage (45) to move forward while pushing the mobile shear (43) to spread up to complete an easy cycle of cutting.

Figure 8:
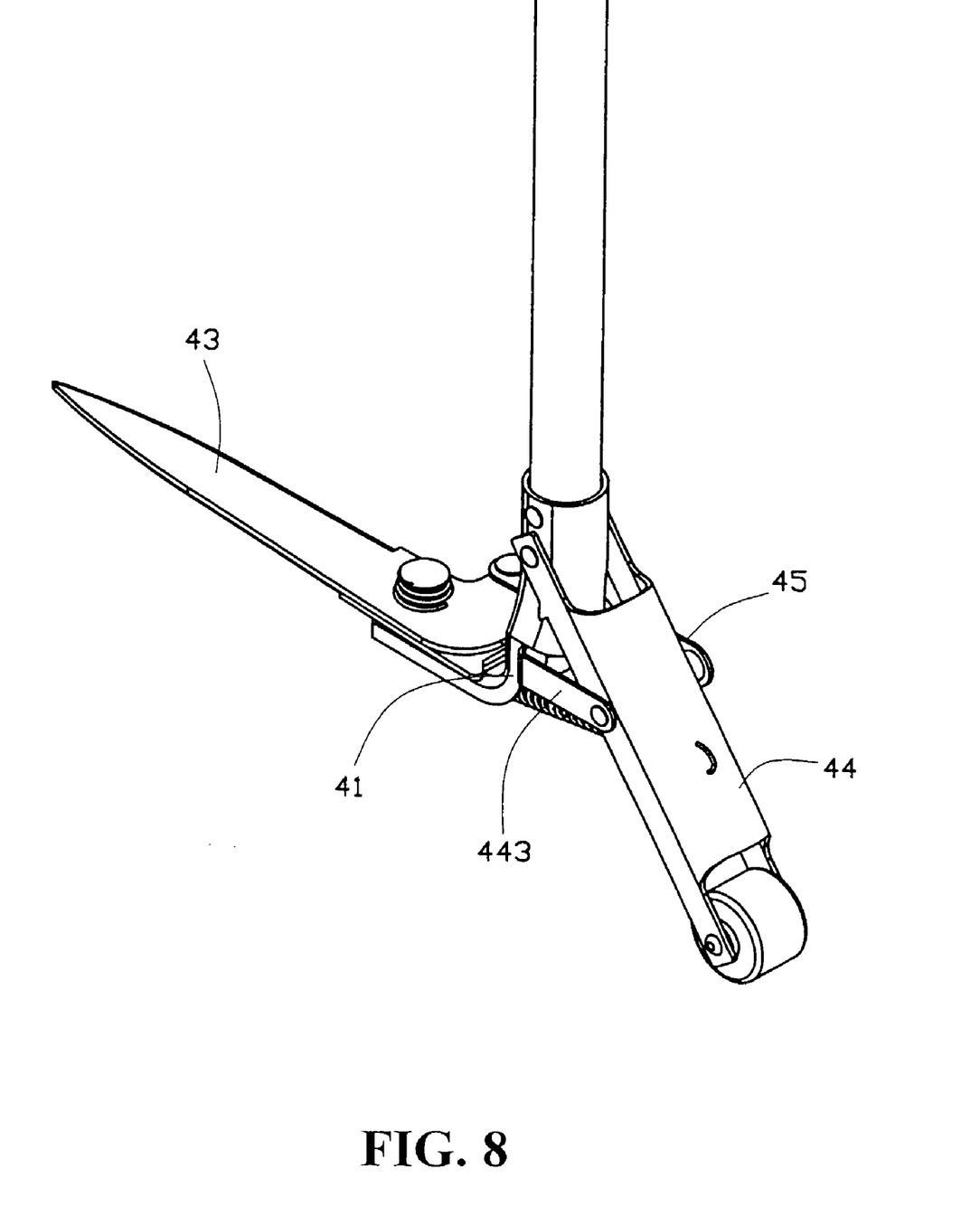
FIG. 8 is a schematic view showing that a locking plate is retracted for fixation of the preferred embodiment of the present invention.

As illustrated in FIG. 8, when the present invention is not used, the locking plate (443) provided by the side of the driver (44) is pushed up to hold against the base (41) to allow the driver (44) open up backward, then the linkage (45) draws to close the mobile shear (43) in position.

It will be understood that each of the elements described above, or two or more together may also find a useful application in other types of methods differing from the type described above.

While certain novel features of this invention have been shown and described and are pointed out in the annexed claim it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A long-stick mower comprising a base, a fixed shear, a mobile shear, a driver, a linkage, an extension spring and an extension control rod; wherein, the fixed shear being assembled to a bottom of the base; the mobile shear being pivoted to a top of the fixed shear by means of a dead spring and a rivet, the linkage having a first end pivoted to an upside of the mobile shear and a second end pivoted to the driver, a locking plate provided by a side of the driver being pushed up to hold against the base to allow the driver to open up backwards for the linkage to draw and close the mobile shear in position when the mower is not used, wherein the base is approximately an L shape having an erected part related to a sleeve fixed to a lower end of the extension control rod; the driver having a top pivoted to the sleeve of the base and a bottom adapted with a caster being drawn towards the base by means of the extension spring and adapted with the locking plate on one side; the extension spring having one end hooked to the bottom of the base and the other end drawing the driver; the extension control rod being inserted into the sleeve of the base; a top of the extension control rod being pressed down for the driver to have the caster holding against ground and the driver spreading up backward to draw the linkage to move backward to pull the mobile shear for cutting in the direction of facing the fixed shear; then the extension control rod being pulled up for the driver to be drawn back by the extension spring to push the linkage to move forward while pushing the mobile shear to spread up to complete an easy cycle of cutting.

* * * * *